US007219631B1

(12) United States Patent
O'Neill

(10) Patent No.: US 7,219,631 B1
(45) Date of Patent: May 22, 2007

(54) HIGH TORQUE, LOW VELOCITY, INTERNAL COMBUSTION ENGINE

(76) Inventor: James Leo O'Neill, 48 Collier Rd., Scituate, MA (US) 02066

( * ) Notice: Subject to any disclaimer, the term of this patent is extended or adjusted under 35 U.S.C. 154(b) by 276 days.

(21) Appl. No.: 10/847,230

(22) Filed: May 17, 2004

Related U.S. Application Data

(63) Continuation of application No. 10/371,652, filed on Feb. 24, 2003, now abandoned.

(51) Int. Cl.

| | |
|---|---|
| ***F02B 75/22*** | (2006.01) |
| ***F02B 57/10*** | (2006.01) |
| ***F02B 57/08*** | (2006.01) |
| ***F16H 25/08*** | (2006.01) |
| ***F16H 25/16*** | (2006.01) |
| *F01B 13/06* | (2006.01) |

(52) U.S. Cl. .................. 123/54.3; 123/54.1; 123/55.7; 123/44 R; 74/55

(58) Field of Classification Search ............... 123/54.3, 123/54.1, 55.7, 55.1, 55.3, 44 R, 44 C, 44 D, 123/44 E, 197.4; 74/55
See application file for complete search history.

(56) References Cited

U.S. PATENT DOCUMENTS

| | | | | |
|---|---|---|---|---|
| 947,226 A | 1/1910 | Dorffel | .......................... | 74/55 |
| 1,047,839 A * | 12/1912 | Redup | ...................... | 123/44 R |
| 1,374,164 A * | 4/1921 | Nordwick | .................. | 123/54.3 |
| RE16,630 E | 5/1927 | Nordwick | .................. | 123/55.1 |
| 1,654,378 A * | 12/1927 | Marchetti | .................. | 123/55.1 |
| 1,729,271 A | 9/1929 | Johnson | ..................... | 123/54.3 |
| 1,735,764 A | 11/1929 | Johnson | ..................... | 123/54.3 |
| 1,783,589 A | 12/1930 | Shepard | ......................... | 74/55 |
| 1,829,780 A * | 11/1931 | Beytes et al. | ............. | 123/54.3 |
| 1,830,046 A * | 11/1931 | White | ....................... | 123/54.3 |
| 1,863,877 A * | 6/1932 | Rightenour | ................ | 123/55.1 |
| 2,038,024 A * | 4/1936 | Craske | ...................... | 123/54.3 |
| 2,265,171 A | 12/1941 | Johnson | ..................... | 123/54.3 |
| 2,433,933 A * | 1/1948 | Stucke | ..................... | 123/44 R |
| 3,274,982 A * | 9/1966 | Noguchi et al. | ........... | 123/55.7 |
| 3,964,450 A | 6/1976 | Lockshaw | .................. | 123/54.3 |
| 4,073,216 A * | 2/1978 | Davis | ....................... | 123/44 R |
| 4,300,487 A * | 11/1981 | Triulzi | ...................... | 123/44 C |
| 5,273,011 A * | 12/1993 | Karlsson | ........................ | 74/55 |
| 5,553,574 A * | 9/1996 | Duncalf | ..................... | 123/54.3 |
| 6,412,454 B1 * | 7/2002 | Green | ....................... | 123/54.1 |
| 6,449,940 B2 * | 9/2002 | Nagel | ...................... | 123/197.4 |
| 6,691,648 B2 * | 2/2004 | Beierle | ...................... | 123/54.3 |

FOREIGN PATENT DOCUMENTS

| | | | | |
|---|---|---|---|---|
| FR | 2707344 A1 * | 1/1995 | ................ | 123/55.3 |

* cited by examiner

*Primary Examiner*—Thai-Ba Trieu
(74) *Attorney, Agent, or Firm*—Alix, Yale & Ristas, LLP

(57) ABSTRACT

An Internal Combustion Engine including a plurality of reciprocating pistons disposed about the periphery of a central housing, and a pair of drive cams responsive to the displacement of the pistons for driving one or more output drive shafts. A piston rod cross member engages cam raceways of a pair of drive cams. Each raceway comprises a plurality of lobes defining power and compression stroke surfaces. Axial displacement of the cross member within the raceway effects rotation of the drive cams and output drive shafts which are rotational coupled to each drive cam. The drive cams and output drive shafts may rotate in the same or opposite directions, delivering high torque at low rotational speeds and, in one embodiment providing a torque-balanced output. Furthermore, the drive cams may include peripheral teeth for driving a timing gear which is timed relative to the output drive shafts for driving auxiliary equipment.

39 Claims, 7 Drawing Sheets

HIGH TORQUE, LOW VELOCITY, INTERNAL COMBUSTION ENGINE

RELATED APPLICATION

This application is a continuation of U.S. patent application Ser. No. 10/371,652, Filed on Feb. 24, 2003 now abandoned and is related to a commonly-owned, US. patent application Ser. No. 10/112,145, entitled "Propulsion System for Vertical Take-Off and Landing (VTOL) Vehicles".

TECHNICAL FIELD

This invention is directed to internal combustion engines, and more particularly, to internal combustion engines employing cam means for converting linear motion of a piston/cylinder into rotational motion of an output drive shaft, and still more particularly, to a new and useful internal combustion engine which maximizes energy conversion, eliminates the need for intermediate speed reduction devices, e.g., speed reducing transmissions, improves performance, enhances reliability and reduces mechanical complexity.

BACKGROUND OF THE INVENTION

Designers of power output devices, e.g., automobile, aircraft and locomotive engines, are faced with a myriad of competing design criteria that result in various design compromises. For example, if it is desirable to optimize power output, a compromise in engine torque is often necessary. Similarly, if one desires optimal energy conversion, e.g., specific fuel consumption, a designer must choose an appropriate air-standard combustion cycle to match this requirement. In yet other examples, if it is desirable to optimize horsepower and torque, one may need to accept weight and/or fuel consumption penalties.

While there are literally thousands of internal combustion engine designs and variations thereof, all employ certain fundamental or basic principles. These include the intake of a combustible mixture, e.g., oxygen and gasoline, into a working area, compression of the combustible mixture, ignition of the mixture to effect its expansion, capturing the energy of the expansion to produce work, and expelling combustion by-products into an exhaust system so as to prepare the working area for a subsequent cycle.

Internal Combustion Engines (ICEs)

Commercially successful internal combustion engines include reciprocating-piston, rotary, and gas-turbine engines. Following is a brief discussion of each followed by the advantages and disadvantages of each. Applications of each are also discussed.

Traditional reciprocating internal combustion engines employ the reciprocating motion of a piston/cylinder to perform the functions described above. Linear motion of the piston is translated into rotational motion by means of a piston rod that is articulately mounted to the underside of the piston at one end thereof and pivotally mounted at the other end to an eccentric portion of a crankshaft. Generally, these internal combustion engines employ the Carnot two-stroke, Otto four-stroke or Diesel two and/or four-stroke air-standard cycles.

The Carnot two-stroke engine typically employs a piston/cylinder arrangement wherein the cylinder comprises inlet and exhaust ports located on opposite sides of the cylinder walls. The inlet port is located slightly above the lowest point of piston travel, e.g., bottom dead center, and the exhaust port is located on the opposing side about a midpoint relative to piston travel. The combustible mixture is first introduced into the cylinder chamber as the piston uncovers the inlet port. The downward motion of the piston from the prior stroke, causes the combustible mixture (located within the housing) to be pressurized thus being forced into the cylinder chamber. As the piston moves upwardly and past the exhaust port, the combustible mixture is compressed and ignited upon reaching the top of the piston's stroke, i.e., top dead center. The expansion of the combustible mixture produces a downward power stoke and, upon passing the exhaust port, begins to be expelled from the cylinder chamber. As the piston travels downward yet further, the combustible mixture is pressured by the underside of the piston (traveling downwardly) and is injected into the cylinder as the piston passes the inlet port. This injection of newly-introduced combustible mixture further augments the expulsion of exhaust gases through the exhaust port. The Carnot two-stroke produces a power stroke for every two strokes of the piston, or once per revolution, i.e., of the drive shaft.

The Otto four-stroke engine typically employs a piston/cylinder arrangement wherein the inlet and exhaust ports are located at the top or uppermost portion of the cylinder and are operated, i.e., opened and closed, by means of cam-driven valves. The combustible mixture is first introduced upon opening the inlet port whereby the downward motion of the piston generates a vacuum for drawing the combustible mixture into the cylinder. The next stroke is the compression stroke, wherein the inlet and exhaust valves are both closed and the combustible mixture is compressed as the piston traverses upwardly. At or near the top of the piston stroke, the air-gas mixture is ignited thus initiating its expansion and downward motion of the piston. Upon completion of the downward or power stroke, the exhaust port is opened such that the subsequent upward stroke of the piston expels the combusted gases outwardly into an exhaust manifold. The Otto four-stroke cycle produces a power stoke for every four stokes of the piston, or once every two revolutions of the drive shaft.

More recent innovations include the Wankel Rotary engine which employ the eccentric motion of a polygonal-shaped rotor within a substantially elliptically-shaped, or more accurately, a epitrochoidally-shaped housing or chamber. The apexes of the polygonal-shaped rotor create discrete chambers which, upon rotation of the rotor within the housing, pass inlet ports, ignition spark plugs and exhaust ports. More specifically, as the rotor passes the inlet port, the combustible mixture is introduced within one of the chambers. As this chamber rotates approximately 90 degrees, the mixture is compressed against a wall of the epitrochoidally-shaped housing. Ignition or spark plugs are located at this angular position and, upon ignition, the combustible mixture expands causing the rotor to be driven approximately 120 degrees within the housing. An exhaust port is located at the next rotational position and the combusted gases are expelled from the chamber. Similar to the compression stage of the Wankel cycle, the chamber is caused to be reduced in volume, i.e., against the wall of the epitrochoidally-shaped housing, thereby expelling the exhaust gases outwardly.

In conventional turbine engines, a compressor section is used to compress air into a combustion chamber. Fuel is introduced into the chamber and ignited to expand the air-gas mixture. Turbine vanes capture the energy of the expanded air-gases to turn a turbine shaft which also drives the compressor section to continue the combustion cycle. Generally, this form of internal combustion engine employs the Brayton air-standard cycle. From its brief description, it will be appreciated that the turbine engine is, perhaps, the most elegant, however, it too has disadvantages which limits its application.

Advantages/Disadvantages & Practical Applications of Reciprocating Piston ICEs

The following is a brief examination of reciprocating piston ICEs in terms of their properties, performance, and practical applications. Inasmuch as the Wankel rotary and turbine engines are not widely employed or have specific/limited applications, these will only be mentioned in terms of there need for gear reduction apparatus to lower output velocities to useable speeds. Furthermore, these engine designs represent a significant departure from the elements and teachings of this invention.

A two stroke air-standard cycle (or Carnot Cycle) delivers a power stoke with each revolution as compared to the four-stroke cycle which delivers a power stroke with every two revolutions. Consequently, reciprocating ICEs employing a two stroke cycle can deliver twice the power of a four stroke. Two stroke engines do not require valves and the associated mechanisms for the intake of fuel and exhaust of combusted gases. Four stroke engines, on the other hand, require a complex array of cam-driven valves for intake and exhaust. ICEs employing a two stroke cycle can operate at any orientation, which can be important in applications wherein the powered-vehicle or device pitches or rolls such as an acrobatic fixed-wing aircraft, helicopter or chainsaw. Engines employing a four-stroke cycle require that oil be delivered from a gravity-based sump. Consequently, four stroke engines typically are designed with the forces of gravity in mind. Two-stroke engines, therefore, offer simplicity and a significant power-to-weight ratio as compared to many four-stroke engine designs.

Disadvantages of the two-stroke air-standard cycle generally involve wear, fuel efficiency and pollution. The lack of a dedicated lubrication system typically results in a high rate of component wear. Further, two-stroke reciprocating engines, which employ a conventional crankshaft, also experience accelerated wear of the piston. To better understand this phenomena, it should be appreciated that the eccentricity of the crankshaft causes the piston rod to be oriented off-axis relative to the piston/cylinder axis. As such, a lateral component of the resultant force vector imposes high frictional forces between the piston and cylinder. Consequently, the piston rings wear, pressure is reduced i.e., causing blow-by, and fuel efficiency decreased. Other disadvantages are simply due to the way fuel is burned (or not burned) in two stroke engines. For example, the exhaust phase of the cycle is, at least in part, combined with the fuel intake and compression phase of the cycle. Consequently, exhaust gases are intermixed with a fresh charge of air-gas, hence, the mixture for ignition is non-optimum, i.e., contaminated by exhaust gases from the previous stroke. Similarly, inasmuch as the intake and exhaust occur nearly simultaneously, but along opposite sides of the cylinder, fresh fuel may be exhausted before ever being compressed and ignited. Consequently, two-stroke engines are not highly fuel efficient.

The principle advantage to a four stroke air-standard cycle (or Otto cycle) relates to fuel efficiency. More specifically, four stroke engines employ a stroke entirely dedicated to the exhaust of combusted gases, hence, four stroke engines burn cleaner and more efficiently that two stroke engines. That is, combusted gases do not intermix with a fresh charge of air-fuel in or during the compression/ignition stroke. Furthermore, four-stroke engines can have independent/dedicated oil and fuel reservoirs, i.e., do not use a gas-oil mixture, hence four stoke engines experience less wear and are less costly to operate.

The disadvantages of four stroke engines have been discussed above, i.e., when being compared to a two stroke engine, however, suffice it to say that four stroke engines deliver significantly less power output than two stroke engines.

Diesel two and four stroke cycles have the same advantages and disadvantages as those discussed above in connection with the Carnot and Otto air-standard cycles. Diesel engines do, however, allow high compression ratios inasmuch as the flash point (i.e., the temperature at which the fuel ignites) of Diesel fuel is substantially higher than conventional gasoline fuel. While this can offer the advantage of high power output, Diesel fuel contains less energy than gasoline (on a BTU/in$^3$ or volumetric basis) and does not produce the same power output when compared to gasoline bumming engines. Generally, the advantage of Diesel engines relates to the low cost of Diesel fuel and the relatively high efficiency with which it burns.

All of the above air-standard cycles and engine designs operate efficiently at relatively high rotational speeds. For example, a gas turbine engine is typically efficient at about ten-thousand (10,000) RPM. Four-stroke automobile engines are efficient within a range of about fifteen hundred to three thousand (1,500 to 3000) RPM. This is also true for the Wankel rotary engine. Typically, such rotational velocities are orders of magnitude above useful speeds to, for example, drive automobile tires, helicopter rotors, ship propellers etc. Consequently, all require speed reduction devices, e.g., transmissions, to lower and control the speed of output drive shafts. It will be appreciated that such devices add significant weight, require periodic maintenance, and are costly to fabricate, operate and maintain.

Other disadvantages of ICEs of the prior art relate to the weight distribution of conventional designs and to a lack of balanced torque output. With respect to the former, the center of gravity (C.G.) of prior art ICEs is frequently offset with respect to the output shaft axis. While this does not present difficulties in many applications, in other applications, such as a compound helicopter, it is beneficial to have the engine C.G coincident with the output drive shaft axis. For example, helicopters typically are designed such that the turbine engines are juxtaposed relative to the helicopter transmission. Despite the output orientation of the turbine engine (which faces forward), a rather elaborate bevel gearing system is employed to ensure that the center of gravity of the turbine engine lies in the same plane (normal to the longitudinal axis of the helicopter). As such, this drive-train configuration is non-optimal in terms of weight and is highly mechanically complex.

With respect to the latter, helicopters typically employ anti-torque devices to counter-act the torque developed in the fuselage as a result of the high torque required to drive the main rotor system. Conventional anti-torque devices employ tail rotors or propulsive thrusters to generate a force vector equal and opposite to the engine-generated moment vector, i.e., at a calculated distance from the rotational axis. As such these devices, which include tail cone structure, tail drive shafts, tail rotor gearboxes also add unnecessary weight.

A need, therefore, exists for an ICE which maximizes energy conversion, eliminates the need for intermediate speed reduction devices, e.g., speed reducing transmissions, improves performance, enhances reliability, reduces weight and minimizes mechanical complexity.

SUMMARY OF THE INVENTION

It is the object of the present invention to provide an Internal Combustion Engine (ICE) that provides high torque output at low rotational velocity thereby reducing or eliminating the need for intermediate speed reduction devices, e.g., transmissions.

It is yet another object of the present invention to provide such an ICE that minimizes mechanical complexity for improved reliability.

It is still yet another object of the present invention to provide an ICE which minimizes or eliminates the need for piston/cylinder lubricants or lubricant systems.

It is yet a further object of the present invention to provide an ICE which employs a reciprocating piston arrangement for maximizing power output.

It is another object of the present invention to provide a reciprocating piston ICE which minimizes transverse loading on the reciprocating piston thereby reducing wear and improving reliability.

It is another object of the present invention to provide such a reciprocating piston ICE that employs counter-rotating output shafts for maximizing power output while balancing torque output.

It is still yet another object of the present invention to provide a reciprocating piston which employs the advantageous features of a two-stroke air-standard cycle while maximizing scavenging pressure to improve performance.

It is yet still another object of the present invention to provide a two-stroke reciprocating piston that generates a power stroke with each stroke of the piston;

It is still another object of the present invention to provide a second output drive shaft that is timed relative to the first or primary output drive shaft for driving auxiliary equipment, These and other objects of the invention are achieved by a an Internal Combustion Engine (ICE) having at least one output drive shaft driven by a pair of drive cams disposed within a housing. In a first embodiment of the invention, a plurality of reciprocating pistons are disposed about the periphery of the housing and a piston rod, having a central shaft and cross member perpendicular thereto, is disposed within radially oriented apertures of the housing. The housing defines at least two chambers and includes aligned apertures for accepting the output drive shaft and a radially oriented cylindrical bore for accepting each of the pistons. Drive cams are disposed in each of the housing chambers and are rotationally coupled to the output drive shaft. Each of the drive cams has a continuous pathway circumscribing the drive shaft axis and defines a plurality of lobes. Bearing means is interposed between and connects an outermost end portion of each of the cross members and the lobed pathway of the drive cams. In operation, axial motion of the piston rod acts on the lobes of the drive cams to effect rotational motion thereby imparting torque to the output drive shaft.

In a second embodiment of the invention, the Internal Combustion Engine (ICE) for delivers torque balanced power output. In this embodiment, the first and second drive cams are disposed within a chamber of the housing and are driven in opposite rotational directions in response to axial reciprocation of the piston/cylinders. More specifically, piston rods, which include a central shaft disposed within a radial aperture of the housing and a cross-member connecting to and disposed perpendicular to the central shaft, impart torque to the drive cams via engagement with lobed raceways thereof. The drive cams are angularly offset such that the axial motion of the piston rods imparts opposing torque vectors on the drive cams. As such, the first and second output drive cams, which are each connected to one of the first and second drive cams, are driven in opposite rotational directions thereby delivering torque-balanced output.

In yet a third embodiment of the invention, the number of lobes on one of the drive cams is a multiple of the number of lobes on the other of the drive cams. In this embodiment, the speed of the first output drive shaft is also a multiple of the speed of the second output drive shaft. Furthermore, the drive shafts may co-rotate or counter-rotate relative to each other.

In yet other embodiments of the invention, an auxiliary drive shaft or tertiary output drive shaft is driven by timed gear that intermeshes with teeth formed about the periphery of one or both of the drive cams. In this embodiment, the auxiliary drive shaft extends through the housing, between adjacent piston/cylinders and is timed relative to the speed of the first and second output drive shafts.

In another embodiment, a second ignition device is disposed through the piston cylinder, in the lower portion of the cylinder i.e., beneath the reciprocating piston, to provide a power stroke with each stroke of the piston. In this embodiment, fuel is injected and expelled through intake and exhaust ports disposed in the lower portion of the cylinder as a function of the position of the piston within the cylinder (functioning as a valve). As such the piston rod, which is sealed relative to the housing aperture, is subjected to tensile loads (during the upward power stroke) and compression loads (during the downward power stroke).

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

The present invention relates to a new and useful cam driven Internal Combustion Engine (ICE) that delivers high torque at low rotational velocity. The preferred embodiment is described in the context of eight reciprocating pistons acting on two internal rotating drive cams that, in turn, drive coaxial output shafts. It will be appreciated, however, that the inventive features of the invention may be applied to similar internal combustion engines having fewer or a greater number of reciprocating pistons, to those having more than two cam drives, to those wherein the drive cams rotate in the same or opposite rotational directions, or to those having a single output drive shaft.

Figure 1C:
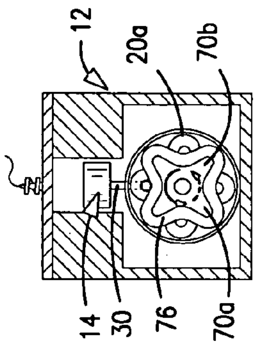
FIGS. 1*a*, 1*b*, and 1*c* depict schematic views of the Internal Combustion Engine (ICE) according to the present invention wherein FIG. 1*a* the output drive shafts of the ICE are driven in the same rotational direction, in FIG. 1*b* the output drive shafts of the ICE are co-axial and counter-rotate relative to each other, and, in FIG. 1*c*, output drive shafts of the ICE are driven in the same rotational directions but at different rotational speeds.
Figure 1B:
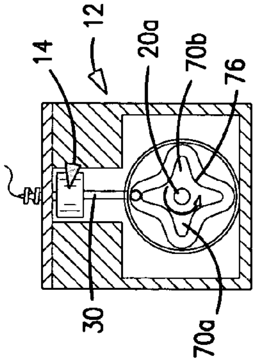
Figure 1A:
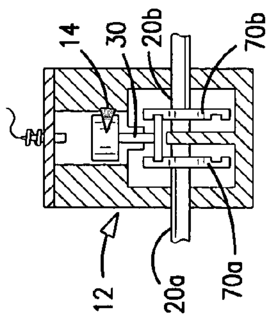

Before discussing the internal details and specific embodiments of the invention, it is useful to obtain a broad overview of the invention by referring to the schematics shown in FIGS. 1*a*, 1*b*, 1*c*. In the broadest sense of the invention, the ICE comprises a housing 12 which supports: a reciprocating piston means 14, i.e., piston/cylinders, first and second drive cams 70*a*, 70*b*, and first and second output drive shafts 20*a*, 20*b*. The piston means 14 drives a plurality of piston rods 30 radially and linearly within the housing 12. The first and second drive cams 70*a*, 70*b* are driven rotationally in response to the linear motion of the piston rods 30.

In FIGS. 1*b* and 1*c*, the first and second drive cams 70*a*, 70*b*, include a plurality of lobes 76 which are either in-phase (as seen in FIG. 1*b*) or, out-of-phase (as seen in FIG. 1*c*). The first and second drive cams 70*a*, 70*b* are responsive to the axial motion of the piston rods 30, i.e., acting on the lobes, such that each is rotationally driven. In FIG. 1*b*, the in-phase lobes cause the drive cams to be driven in the same rotational direction, while in FIG. 1*c*, the out-of-phase lobes 76 cause the drive cams 70*a*, 70*b* to be driven in opposite rotational direction. As such, the output drive shafts 20*a*, 20*b*, which are rotationally coupled to the drive cams 70*a*, 70*b*, may drive in the same or opposite rotational direction. When the drive shafts 20*a*, 20*b*, drive in opposite rotational directions, a torque-balanced output is achieved.

Figure 2:
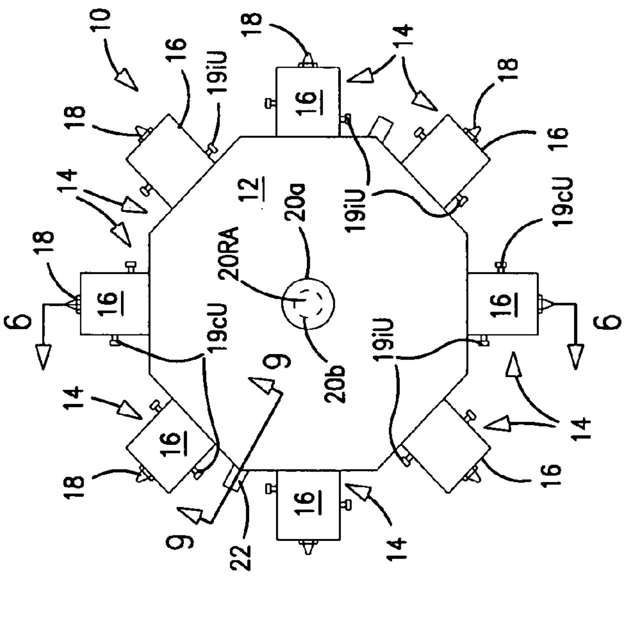
FIG. 2 depicts a front view of the ICE according to the present invention.

The following drawings illustrate an exemplary embodiment of an Internal Combustion Engine (ICE) according to the present invention. More specifically, and referring to FIGS. 2 and 3, the ICE 10 according to the present invention includes a central housing 12 having a plurality of radially oriented reciprocating piston/cylinders 14 disposed about the periphery of the housing 12. While the piston/cylinders 14 are depicted as being separate elements mounted to the central housing 12, one will appreciate that the outer housings 16 of each piston/cylinder may be integral with the central housing 12, i.e., the bore of each piston (not shown in FIGS. 2 and 3) may be machined integrally therein. Consequently, the housing 12 generically refers to any structure which functions to support internal working components, therefore, includes and items such as the outer cylinder housing 16.

Figure 3:
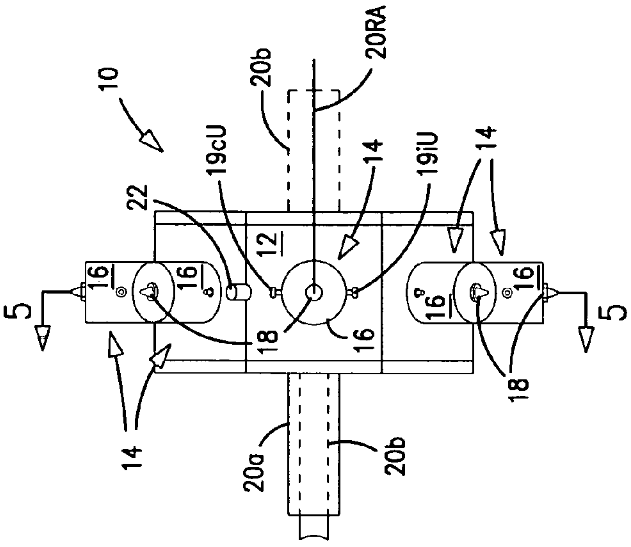
FIG. 3 depicts a side view of the ICE according to the present invention.

Each of the piston/cylinders 14 includes an ignition device, e.g., a spark plug 18, and employs a Carnot two-stroke air-standard combustion cycle, hence, the intake and exhaust ports, $19i_u$, $19e_u$, respectively, are located at an appropriate position relative to the internal reciprocating piston (not shown}. In the preferred embodiment, the ICE 10 drives output drive shafts 20*a*, 20*b* and, may also drive one or more auxiliary output shafts 22 orthogonal to the axes $\mathbf{20}_{RA}$ of the output drive shafts 20*a*, 20*b*. The output drive shafts 20*a*, 20*b*, may be co-axial, concentric and disposed through a single side of the housing 12 as shown or may be co-axial, but extend outwardly from oppositely disposed sides of the housing 12. That is, each of the output shafts 20*a*, 20*b*, being 180 degrees from the other of the shafts 20*a*, 20*b*. FIG. 3 shows the second output shaft 20*b* in dashed lines to illustrate this embodiment of the invention.

Figure 4A:
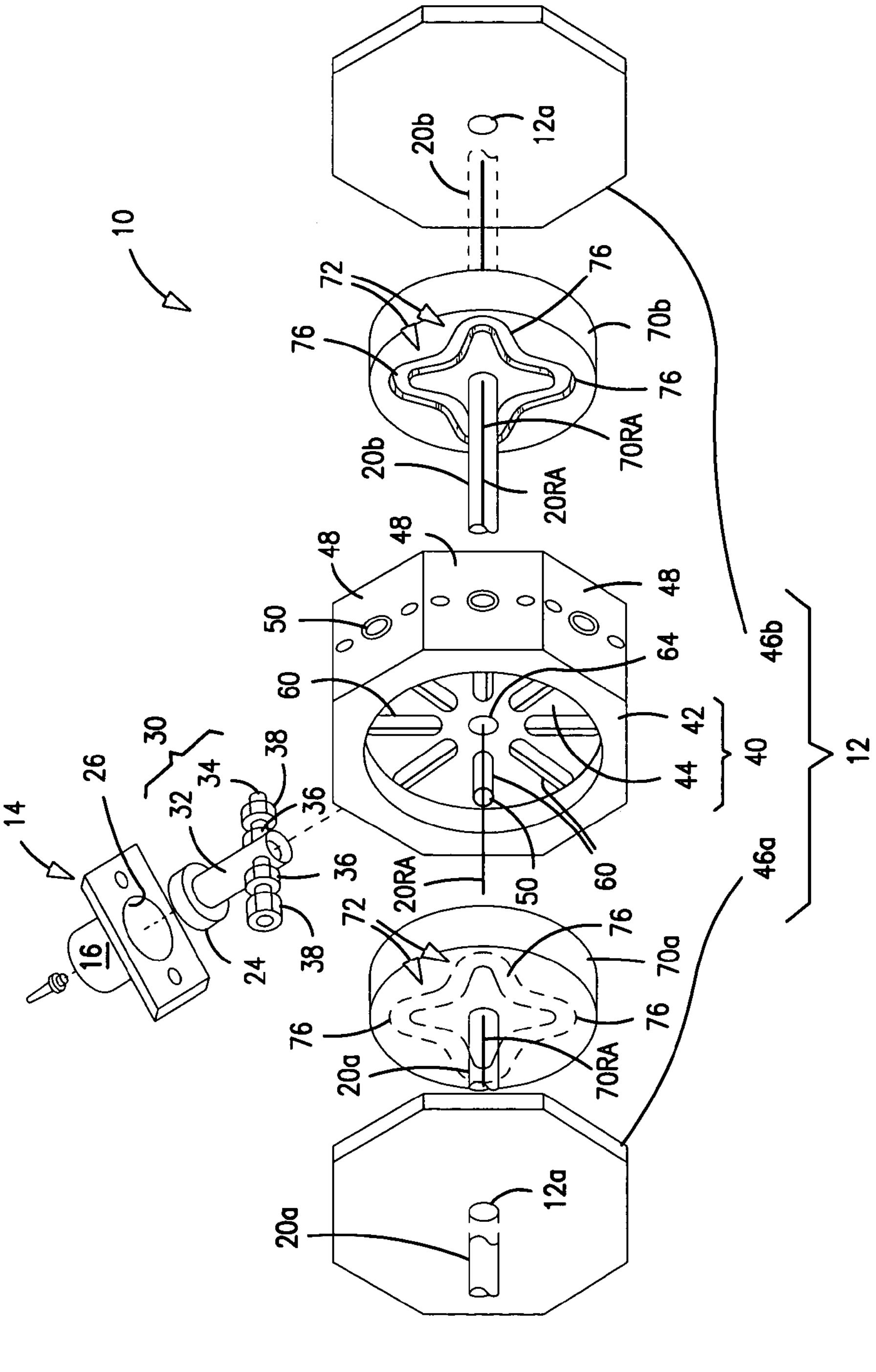
FIG. 4*a* depicts an exploded view of the ICE of the present invention including a housing, piston/cylinders disposed about the periphery of the housing, piston shafts, a pair of drive cams having lobed raceways, and output drive shafts.

In FIG. 4*a*, an exploded view of the ICE 10 is shown to reveal the principal internal components. Certain well-known elements such as gaskets, seals, shaft bearings etc., have been omitted to enhance the clarity of illustration. As briefly discussed in the schematic drawing, the principle internal components of the ICE 10 include, the reciprocating pistons 24, piston rods 30, a central body portion 40 of the housing 12, and drive cams 70*a*, 70*b*. The structure, function and interaction of each are described below.

Each piston 24 reciprocates within a central bore 26 of the piston/cylinder housings 16 and drives a piston rod 30 having a generally inverted-T configuration. That is, each piston rod 30 comprises a central shaft 32 and a cross member 34 which is substantially perpendicular to the central shaft 32. The central shaft 32 is rigidly or articulately mounted to the underside of the piston 24 and is substantially radial relative to the axes $\mathbf{20}_{RA}$ of the output drive shafts 20*a*, 20*b*. The benefits of such orientation will be described in greater detail below, however, the orientation of the piston rod 30 will generally impact the torque output of the ICE 10. Disposed over the cross member 34 is an innermost or first rolling element bearing 36 and an outermost or second rolling element bearing 38, the function of each being described in greater detail hereinafter.

The central housing 12 includes a center body portion 40 having a generally octagonal-shaped peripheral rim 42 and a central web 44 formed internally of and integrally with the peripheral rim 42. End plates 46*a*, 46*b*, having the same octagonal shape of the peripheral rim 42, close each end of the center body portion 40 to define internal chambers or cavities between the central web 44 and each end plate 46*a* and 46*b*. Moreover, a central aperture 120 is formed in at least one of the end plates 46*a*, 46*b* to accept the output drive shafts 20*a*, 20*b*.

The end plates 46*a*, 46*b* of the central housing 12 may be affixed to the center body portion 40 by any of a variety of means. In the preferred embodiment, the end plates 46*a*, 46*b* are fastened by a plurality of through-bolts (not shown) to the peripheral rim 42 of the center body portion 40.

While the central housing 12 is shown to have a generally octagonal external appearance, such configuration facilitates the mounting of each piston/cylinder housing 16 to the central housing 12, i.e., along planar surfaces 48 thereof. As mentioned previously, each piston/cylinder 14 may be integrally formed or machined within the central housing 12 or may vary in number, and, consequently, the external configuration thereof may take on a variety of shapes including cylindrical, hexagonal, decagonal, or other polygonal configurations.

The center body portion 40 further includes radially oriented apertures 50 and slots 60 for accepting each piston rod 30. More specifically, the apertures 50 extend through the peripheral rim 42 and central web 44 in a substantially radial direction, i.e., toward the drive shaft axes $\mathbf{20}_{RA}$, and accept the central shaft 32 of each piston rod 30. The slots 60 extend through the web 44 in a lateral direction and accept the cross members 34 of each piston rod 30. Moreover, the innermost bearings 36 are interposed between the cross members 34 and each slot 60. Finally, in the preferred embodiment, the central web 44 includes an output aperture 64 aligned with a central aperture $\mathbf{12}_o$ of the housing for accepting at least one of the output drive shafts 20*a*. 20*b*.

Figure 4C:
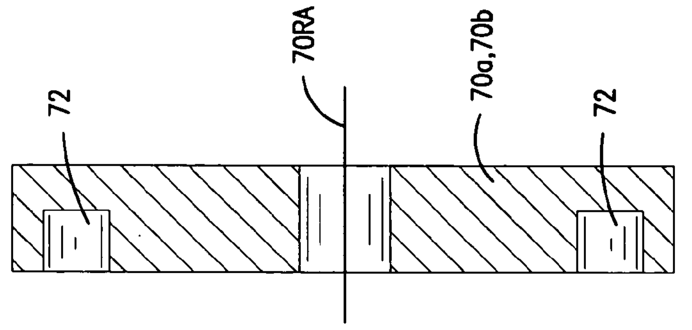
FIG. 4*c* depicts a cross-sectional view taken along line 4*c*—4*c* of FIG. 4*b;*
Figure 4B:
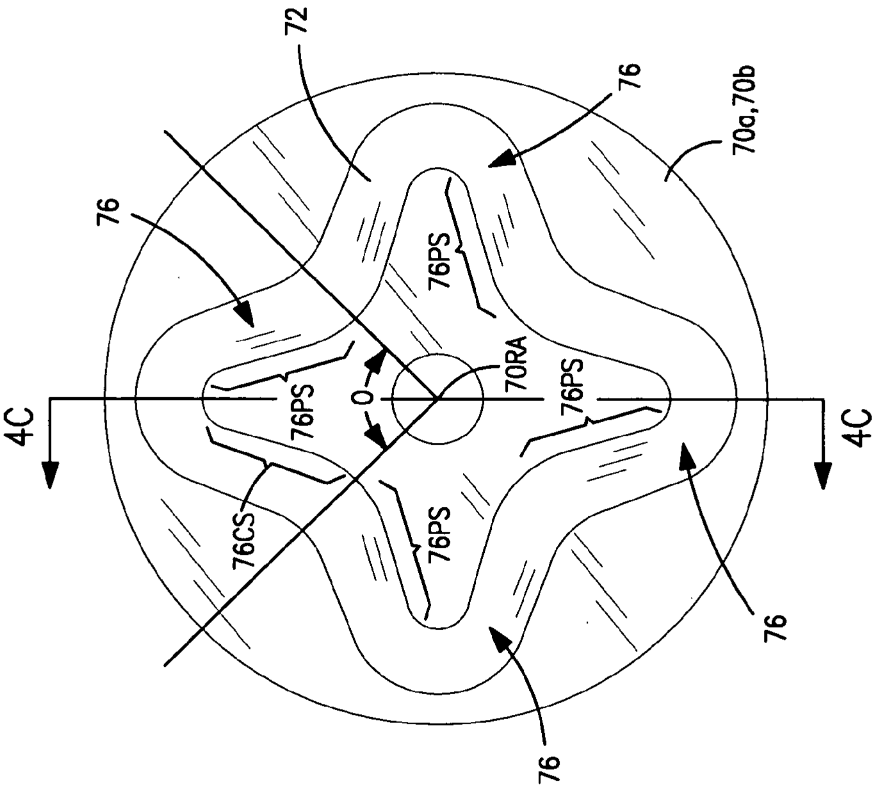
FIG. 4*b* depicts an isolated front view of a drive cam according to the present invention.

Within the central housing 12 are first and second drive cams 70*a*, 70*b* each having a generally disc-shaped configuration and an axis of rotation $\mathbf{70}_{RA}$. More specifically, and referring to FIGS. 4*a*–4*c*, each of the drive cams 70*a*, 70*b* includes a continuous raceway or cam path 72 circumscribing its rotational axis $\mathbf{70}_{RA}$ and having a repeating sinusoidal pattern or configuration (only one drive cam 70*a* is depicted in FIGS. 4*b*, 4*c* inasmuch as, in this embodiment of the invention, the drive cams 70*a*, 70*b* are essentially identical). In the preferred description, each raceway 72 defines approximately four (4) sign waves or four (4) "lobes" 76 (see FIG. 4*b*). Each lobe 76, furthermore, defines power and compression stroke surfaces 76PS and 76CS, respectively. While the preferred embodiment depicts a sign wave configuration to define the lobes 76, the invention anticipates other variations of a wave pattern and is not limited to this specific shape or curvilinear raceway.

Furthermore, the drive cams 70*a*, 70*b* are paired such that the raceway 72*a* of a first drive cam 70*a* faces the raceway 72*b* of a second drive cam 70*b*. In a first embodiment of the invention each of the raceways 72 are symmetric, i.e., the lobes 76 are in-phase (i.e., angularly aligned), and the drive cams 70*a*, 70*b*, co-rotate about rotational axis $\mathbf{70}_{RA}$. In a second embodiment, discussed in greater detail below, the raceways 72*a*, 72*b* are out-of-phase (i.e., the lobes 76 are not angularly aligned), and the drive cams 70*a*, 70*b* counter-rotate relative to each other. In yet another embodiment, the number of lobes may vary, (i.e., multiples of each other) and the drive cams may operate at different rotational speeds, either in the same or opposite directions.

Referring again to FIG. 4*a*, each of the drive cams 70*a*, 70*b* are rotationally coupled to and drive one of the output drive shafts 20*a*, 20*b*. In the preferred embodiment, the drive cams 70*a*, 70*b* are press-fit to the output drive shafts 20*a*, 20*b*, however, other connecting means such as splines, teeth, or keyways may be employed. The drive shafts 20*a*, 20*b* may be coupled to drive in the same rotational direction or co-axial (one shaft 20*b* within the other shaft 20*a*) to drive in opposite rotational directions.

Figure 6:
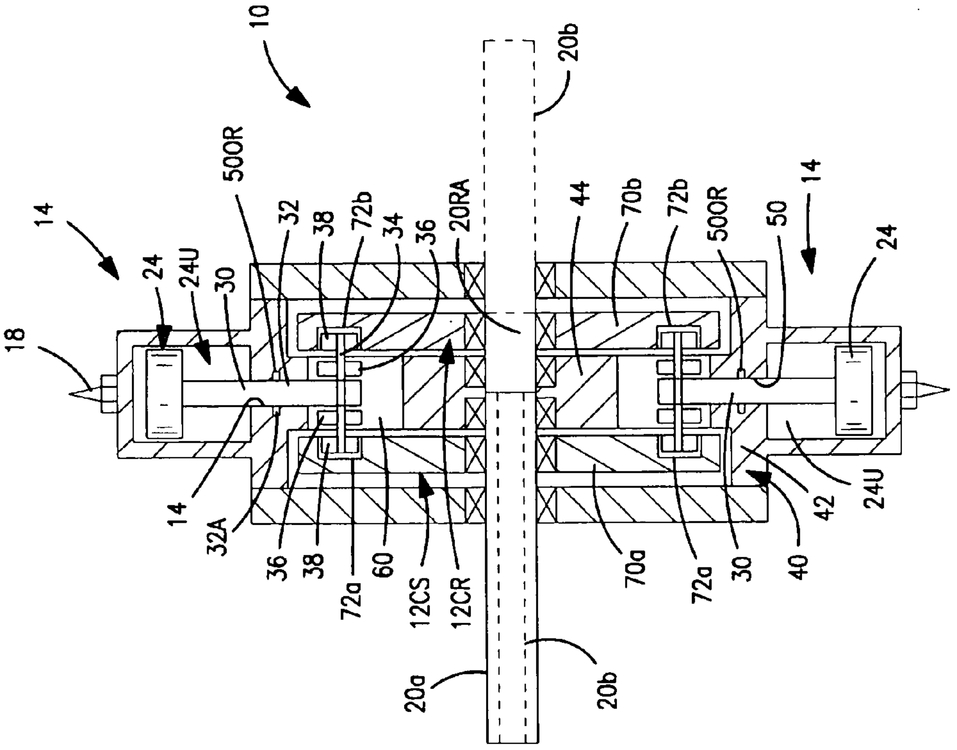
FIG. 6 depicts a cross-sectional view taken substantially along line 6—6 of FIG. 2.
Figure 5:
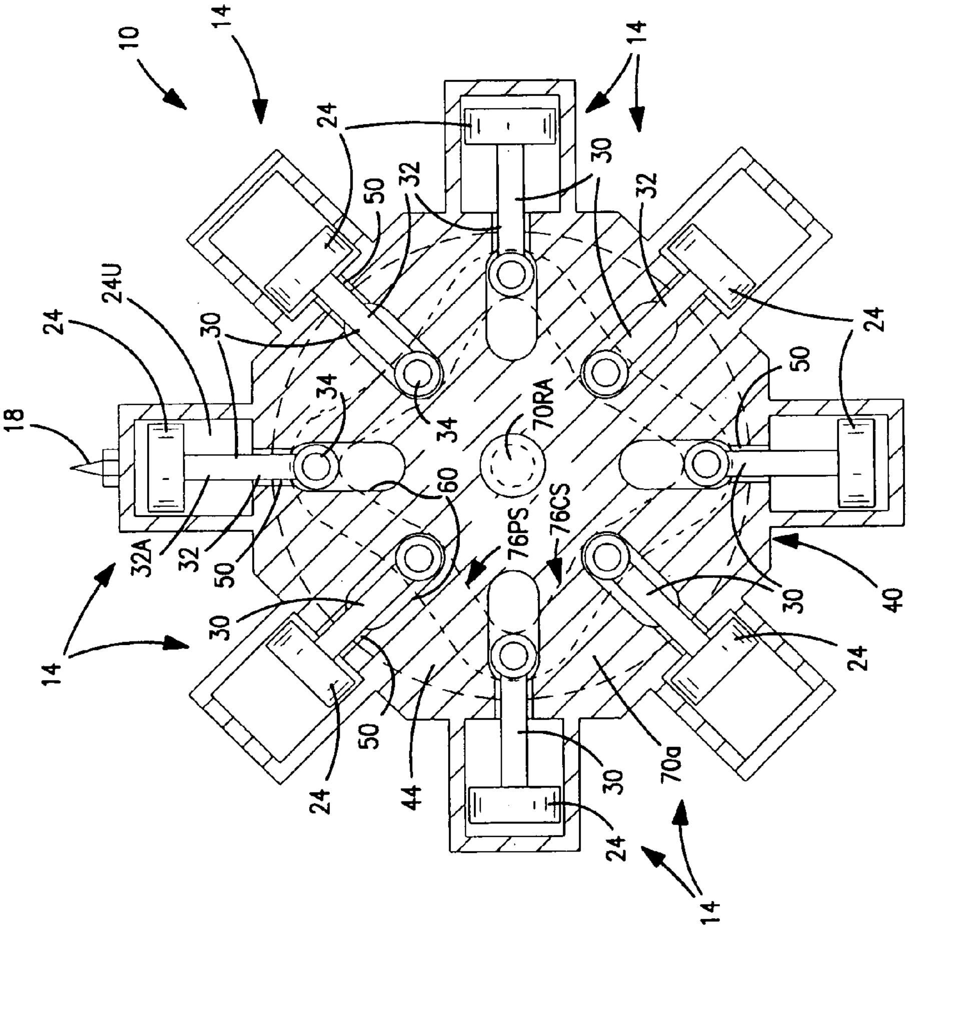
FIG. 5 depicts a cross-sectional view taken substantially along line 5-5 of FIG. 3.

A better understanding of the operation of the inventive ICE 10 may be had by examination of FIGS. 5 and 6. Referring to FIG. 5, the pistons 24 of each piston/cylinder 14 reciprocate axially to effect linear motion of the respective piston rods 30. In the preferred embodiment, a Carnot two-stroke air-standard cycle is employed to produce maximum power (for each piston stoke) and to eliminate the need for complex valving. The axes $\mathbf{32}_A$ of each central shaft 32 is oriented in a substantial radial direction relative to the rotational axes $\mathbf{20}_{RA}$ of the output drive shafts 20*a*, 20*b*. While a radial orientation is preferred, it may be desirable to offset the axes $\mathbf{32}_A$ to produce a larger moment couple thereby producing even greater torque output.

Inasmuch as the motion of piston rod shaft 32 is linear, it is desirable to seal the central shaft 32 relative to its respective piston aperture 50, e.g., via a conventional O-ring seal $\mathbf{50}_{OR}$ (seen only in FIG. 6). As such, the scavenging pressure in the lower portion or chamber of the piston cylinder 24*u* may be substantially increased to boost the pressure within the piston/cylinder 14, i.e., as the air-gas mixture is injected into the piston/cylinder 14. In an alternate embodiment of the invention, discussed in greater detail hereinafter, a secondary ignition device may be introduced on the underside 24*u* of the piston 24, thereby generating a power stroke with each stroke of the reciprocating piston 24.

The cross member 34 of each piston rod 30 engages the radial slot 60 of the central web 44 and each of the drive cams 70*a*, 70*b* (see FIG. 6). Specifically, the innermost bearings 36 ride along and engage the radial slot 60 and the outermost bearings 38 engage and ride within the raceways 72*a*, 72*b* of the first and second drive cams 70*a*, 70*b*. In operation, the axial displacement of the piston rod 30 causes the cross members 34 to act on the inclined power and compression surfaces 76PS, 76CS (shown in phantom lines in FIG. 5) of the lobed raceways 72*a*, 72*b*, to effect rotational motion of the drive cams 70*a*, 70*b*. More specifically, a downward stroke of the piston rod 30 on the power stroke surface 76PS of the lobe 76 generates a tangential load on the drive cams 70*a*, 70*b*, thereby driving the cams, and consequently, the output drive shafts 20*a*, 20*b*. The inertia of the drive cams 70*a*, 70*b*, in conjunction with the inertia of the output drive shafts 20*a*, 20*b*, causes the compression stroke surfaces 76CS to drive the piston rod 30 upward, thereby compressing the air-fuel mixture within the piston cylinders 14.

As a consequence of the linear-to-rotary translation, it will be appreciated that high torque loads are developed in the cross members 34. The ICE 10 of the present invention employs an efficient torque reaction means defined by the interaction between the radial slots 60 in the central web 44 and the innermost rolling element bearings 36. More specifically, the radial slots 60 are particularly rigid, i.e., structurally efficient, within the housing 12 due to the structural continuity of the central web 44, i.e., the central web 44 is a unity structure extending diametrically across the center body portion 40, i.e., the peripheral rim 44, of the housing 12. As such, in this embodiment of the invention, the central web 44 defines two discrete housing chambers $\mathbf{12}_{C1}$ and $\mathbf{12}_{C2}$ (see FIG. 6) Moreover, the ICE 10 employs rolling element bearings, in contrast to various sliding element bearings occasionally seen in the prior art, to react the load along a "point", and between each drive cam 70*a* or 70*b* and the piston rod shaft 32. The combination of the location, i.e., the torque reaction means, and the proximate positioning to the drive cams 70*a* or 70*b*, i.e., the source of the torque to be reacted, reduces the moment arm therebetween and, consequently, minimizes the torque load to be reacted.

Referring again to FIG. 4*b*, the drive cams 70*a*, 70*b* rotate though an angle equal to the arc length of one lobe 76 with each cycle of a reciprocating piston. In the described embodiment, a drive cam having four lobes will rotate through an angle θ of about 90 degrees with every piston cycle (i.e., two strokes). It will, therefore, be appreciated that the ICE 10 of the present invention avails the designer nearly limitless options with respect to determining an engine speed (i.e., of the output drive shafts) by defining the number of lobes to be employed. For example, since two cycle reciprocating piston/cylinders operate very efficiently at about 1500 to 2000 cycles (or 3000 to 4000 strokes) per minute, drive cams 70*a*, 70*b* having four lobes will rotate at about 400 to 500 revolutions per minute. Alternately, drive cams having 10 lobes will rotate at about 150 to 200 revolutions per minute.

In the preferred embodiment, the firing pattern of the piston/cylinders comprises the ignition and downward stoke of four (4) pistons simultaneously, each acting on a power stroke surface 76PS of one lobe 76. In an ICE having eight piston/cylinders, alternating pistons/cylinders are fired first, and the remaining piston/cylinders are subsequently fired. Consequently, with each 45 degrees of drive cam rotation, a power stoke is initiated. When employing an odd number of lobes and an even number of P/Cs, the firing pattern may be even smoother. That is, a firing pattern may be based upon a calculation which divides a full rotation (i.e., 360 degrees) by the quotient of the number of P/Cs with the number of drive cam lobes. For example, an ICE 10 having eight (8) P/Cs and three (3) drive cam lobes yields a quotient of twenty-four (24). A full rotation of 360 degrees divided by 24 suggests that an ICE so configured can employ a firing pattern having a power stroke with every 15 degrees of drive cam rotation. Thus, a smoother, i.e., low vibration ICE may result.

Figure 7:
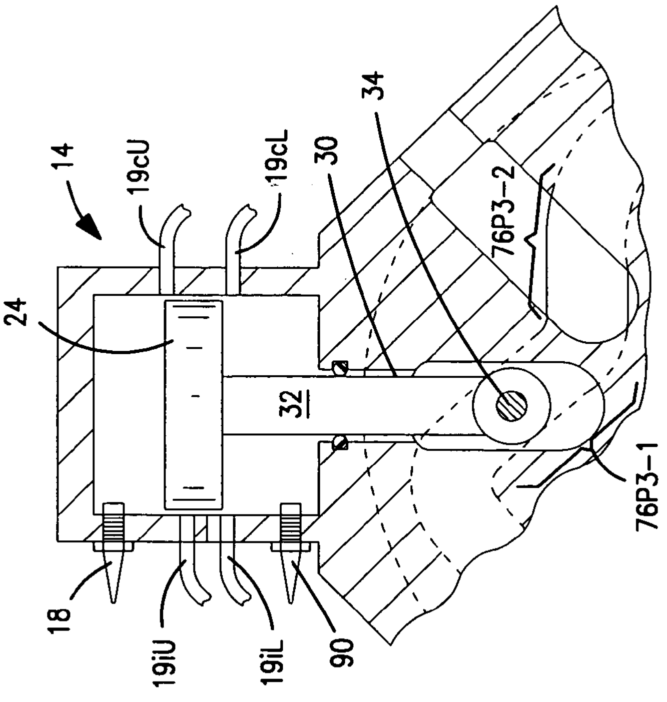
FIG. 7 depicts an alternate embodiment of the invention wherein a second ignition device is disposed in the lower portion or chamber of the piston/cylinder to augment the power output of the piston/cylinder.

As previously mentioned, the linear motion of the piston rods 30 provides an opportunity to seal the central shaft portions 32 thereof to the respective 50 thereby increasing the scavenging pressure in a conventional two-stroke piston cylinder. Furthermore, in yet another embodiment of the invention shown in FIG. 7, a second ignition device 90 may be employed in each cylinder 14 and on opposing sides of the piston 24 to develop a power stroke with each stroke of the piston 24. In this embodiment, fuel is injected and expelled through intake and exhaust ports $\mathbf{19}i_L$, $\mathbf{19}e_L$, respectively, disposed in the lower portion of the cylinder as a function of the position of the piston 24 within the cylinder 14 (functioning as a valve). Furthermore, the cross member 34 of each piston rod 30 acts on opposing first and second power stroke surfaces 76PS-1 76PS-2, such that the central shaft 32 of the piston rod 30 is in compression upon a downward stroke of the piston 24 and in tension (acting on the uppermost raceway surface 76PS-2) upon an upward stroke of the piston 24.

The simplified construction and configuration of the ICE 10 of the present invention facilitates fabrication via a variety of low-cost manufacturing approaches. Reference is made collectively to FIGS. 4*a* through 7. Preferably, the center body portion 40 of the housing 12, and the drive cams 70 are high-speed machined using Numerically Controlled (NC) cutting apparatus. For example, a block of steel or aluminum in the general shape of the center body, e.g., a solid cylinder, octagon, etc. formed by forging, machining, casting or other known method. Initially this block is about six (6") inches in thickness. Piston rod apertures 50 are then drilled radially inwardly from the periphery of the cylindrical block. The longitudinal depth of the apertures 50 include the combined length of the central shaft 32 of the piston rod 30 (from the plane defined by the underside of the piston to the tip end including the thickness of the cross member 34) and the length of the slot 60 (e.g., minimally the length of piston stroke). Further, if timing gears are desired, one or more additional apertures are also drilled.

Next, the block is laid flat to high speed machine each side of the central web 44. In this step, material is cut away to a depth of about two inches thereby creating each cam chamber or cavity $\mathbf{12}_{c1}$. $\mathbf{12}_{c2}$ and leaving a web thickness of about two (2") inches. Minimally, the thickness of the central web 44 will be about one and one-half to two times (1½–2×) the diameter of the central shaft 32 of the piston rod 30. Again, if a timing gear 80 is anticipated, a cut-out is machined in the web 44 to accept the gear 80. The radial slots 60 are then machined through the central web 44 intersecting with each piston rod aperture 50. The width of the slot 60 will be larger than the diameter of the piston rod apertures 50 and slightly greater than the diameter of the innermost needle or roller bearing 36. In the preferred embodiment, the diameter of the bearing 36 is about one and three-eights inches (1⅜") and the width of the radial slot 60 is about one and seven-sixteenths inches (1 7/16"). As alluded to above, the slot length will be minimally equal to the stroke of the piston rod 30, which in the preferred embodiment is about two inches (2"). A central aperture 64 is also drilled to accept the coaxial output drive shafts 20*a*, 20*b*. Next, the external surfaces of the peripheral rim 42 is ground to accept each piston/cylinder housing 16 and end plates 24*a*. 24*b*.

Upon completion of the initial rough-machining operations, the bearing surfaces 60*s* of the slots 60 and the piston rod aperture surfaces 50*s* may be hardened to provide greater wear resistance. Accordingly, the bearing surfaces 50*s*, 60*s* may be masked and the entire center body 40 placed in a copper bath to electolytically deposit copper on all exposed surfaces. Next, the masking material is removed from the bearing surfaces 50*s*, 60*s* and the center body 40 is treated in a carborization vessel. Therein, carbon penetrates and permeates all bearing surfaces without penetrating areas which are copper-coated. Finally, the bearing surfaces 50*s*, 60*s* and the peripheral rim 42 are precision ground to final dimensions.

The drive cams 70*a*, 70*b* are fabricated in a similar manner. Plates having a cylindrical or disc-like configuration are routed to form the lobed cam raceways 72. Each of the drive cams 70*a*, 70*b* are approximately one and one-half inches (1½") in thickness. Furthermore, the height of the cam raceways 72 are slightly greater than the diameter of the outermost needle or ball bearing 38 approximately or about one and seven-sixteenths inches (1 7/16"), and the depth of the cam raceways 72 are about one and one-quarter inches (⅝"). Similar to the center body housing, it may be desirable to surface harden the cam raceways 72. The same masking and carborizing steps may be followed as described above.

The present invention is useful in any engine application wherein high torque is required in combination with low rotational speed. For example, tug boat engines must generate enormously high torque while turning a thrusting propeller at very low RPM. Similarly, rotorcraft turbine engines must generate high torque while turning the lifting rotor at about 300 revolutions per minute. The ICE 10 of the present invention is applicable to both such applications, and many more, while at the same time, eliminating the cost, maintenance and weight of intermediate speed reduction devices. That is, by first determining/designing the number of drive cam lobes 76, the ICE 10 of the present invention may be configured to produce a rotational speed that is appropriate for the high torque, low speed application.

Should slight speed deviations be sought or desired, the speed of the reciprocating pistons 24 may be increased or decreased to vary the speed of the drive cams 70*a*, 70*b*, and output drive shafts 20*a*, 20*b*. For example, it is common for a helicopter rotor to be controllable within a range of between within 93% NR to about 107% NR. The ICE of the present invention could be readily adaptable to this application thereby eliminating the need for input modules, main gearbox modules, and multi-stage, speed-reducing epicyclical gearing. As such, hundreds of pounds of intermediate gearing/transmissions could be eliminated.

Figure 8C:
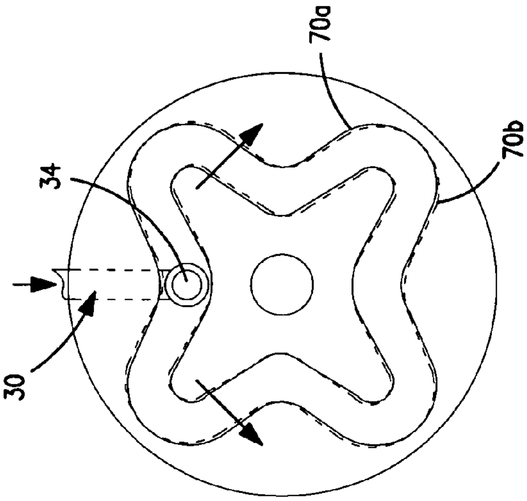
FIGS. 8*a*, 8*b*, and 8*c*, depict an alternate embodiment of the invention wherein the drive cams rotate in opposite directions and are shown in several operating positions in response to axial displacement of a piston rod.
Figure 8B:
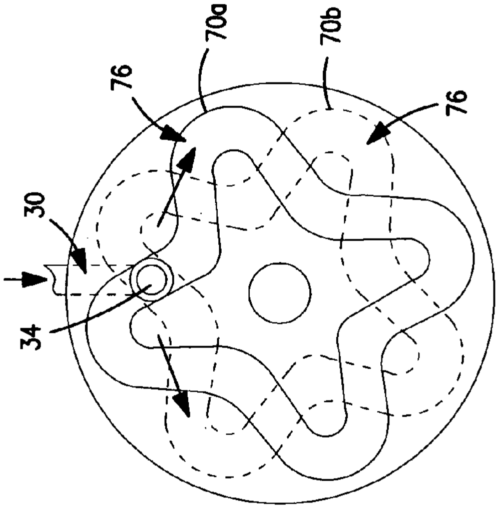
Figure 8A:
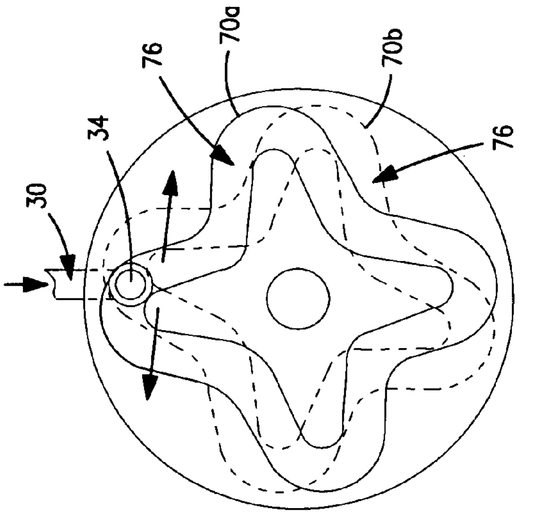

Thus far, the ICE of the present invention has made little or no distinction between drive cams 70*a*, 70*b* which are "in phase", i.e., angularly aligned relative to one another, or to those which are "out-of-phase", i.e., angularly offset. In general, all of the above teaching can be employed for either drive cam orientation or rotational direction. Referring now to FIGS. 8*a*, 8*b* and 8*c*, an important and particularly useful embodiment of the ICE is depicted wherein the drive cams 70*a*, 70*b* are out-of-phase with respect to one another (drive cam 70*a* is shown in solid lines while drive cam 70*b* is shown in dashed lines). That is, the lobes 76 of the first drive cam 70*a*, are angularly advanced with respect to second drive cam 70*b*. Referring to FIG. 8*a*, the cross member 34 of each piston rod 30 engages the lobes 76 is a "scissors-like" pattern, wherein during a downward power stroke, the cross member 34 splits the lobes, as if pushing down the cutting edges of a scissors (causing the scissors to open). FIG. 8*b* shows a second angular position wherein the drive cams are rotating in opposite rotational directions as indicated by arrows $F_T$. Yet a third angular position is shown in FIG. 8*c*, wherein the drive cams 70*a*. 70*b* and respective lobes 76 essentially overlap, yet are ninety (90) degrees out-of-phase.

During an upward compression stroke the lobes 76 come together, i.e., pushing the cross member upward, like the cutting blades of a scissors. One can simply envision the reverse of the positions depicted in FIGS. 8*a*–8*c*. That is, examining FIGS. 8*a*–8*c* in reverse order, or from FIG. 8*c*, to FIG. 8*b* and finally to FIG. 8*a*. Consequently, when positioning the lobes in an out-of-phase orientation, the drive cams 70*a*, 70*b* counter-rotate at the same rotational speed, i.e., assuming that each drive cam 70*a* or 70*b* contains the same number of lobes 76. Furthermore, the output drive shafts 20*a*, 20*b*, counter-rotate to torque-balance the power output.

In yet another embodiment (not illustrated), the number of lobes 76 on one of the drive cams 70*a*, 70*b*, is a multiple number or integer relative to the number of lobes 76 on the other of the drive cams 70*a*, 70*b*. For example, if the number of lobes 76 of the first drive cam 70*a* is two (2) then the number of lobes on the second drive cam 70*b*, is a multiple of two (2), hence is four (4), eight (8), etc. As such, the second drive cam 70*b* rotates at one-half the rotational speed as the first drive cam 70*a*. Moreover, this variation in lobe number applies to both earlier embodiments wherein the drive cam lobes 70*a*, 70*b* rotate in the same or opposite directions. This embodiment is useful wherein different output speeds are desired.

Figure 9:
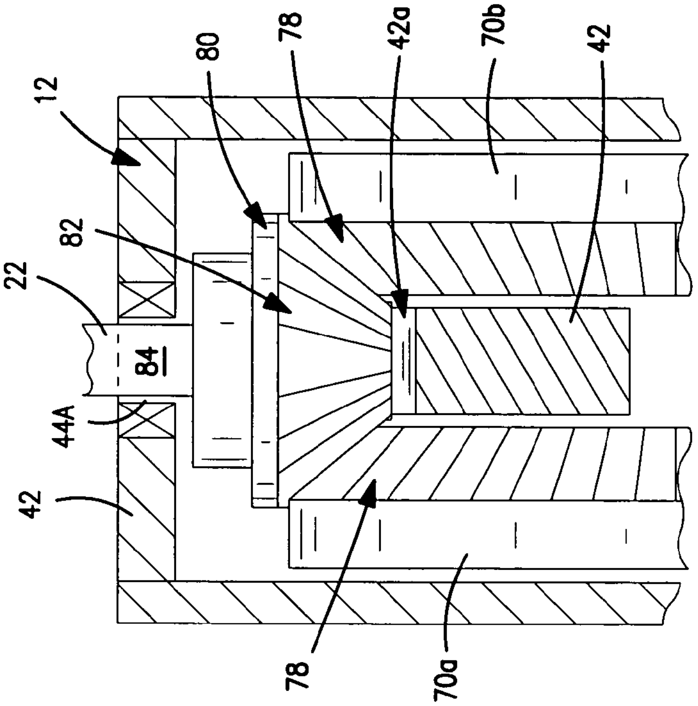
FIG. 9 is a partially broken away, cross sectional view taken substantially along line 9—9 of FIG. 2 depicting an alternate embodiment of the present invention wherein one or both of the drive cams include peripheral gear teeth which engage a bevel or pinion gear to establish and fix the relative angular alignment of the drive cams, to provide another output for driving auxiliary equipment, and/or for load sharing.

In FIG. 9, an alternate embodiment of the present invention is shown wherein each of the drive cams 70*a*, 70*b* include peripheral gear teeth 78 which jointly engage a timing gear 80 to establish and fix the relative angular alignment of the drive cams 70*a*, 70*b*. That is, the housing 12 may be adapted to include a means for rotationally supporting the timing gear 80 along the underside of the peripheral rim 42. The timing gear includes bevel or spur gear teeth 82 for intermeshing with bevel or face gear teeth 78 of each drive cam 70*a*, 70*b*. In the preferred embodiment, an opening 44*o* is formed in the central web 44 adjacent the underside of the peripheral rim 42 and a radial aperture 44A is formed in the rim 42 to accept a radial shaft 84. The radial shaft 84 extends into the opening $44_o$ and functions to rotationally support the timing gear 80 which rotates about the shaft 84. As such, the timing gear 80 functions to ensure that the drive cams 70*a*, 70*b* maintain their desired angular offset or rotational orientation, while furthermore, serving to effect load sharing between the cams 70*a*, 70*b*. That is, whenever a singular input (such as, in the present invention, a piston rod 30), effects the transfer of load into two rotating output devices (such as the drive cams 70*a*, 70*b* of the present invention), load sharing must be considered to ensure that all of the load is not transferred to only one output device. Consequently, the timing gear 80 also functions as a means for effecting load sharing by causing an overload condition in one of the rotating drive cams 70*a*, 70*b* to be transferred to the other of the drive cams 70*a*, 70*b*.

Furthermore, the radial shaft 84 may extend through the peripheral rim 42 to function as a timed shaft for driving auxiliary equipment. That is, the radial shaft 84 may dually serve as the auxiliary drive shaft 22 for driving such equipment as alternators, generators, oil pumps, oil coolers, etc. For instances wherein synchronous timing or load sharing are not desired, the timing gear 80 may function solely to drive an auxiliary output drive shaft. Furthermore, while the timing gear 80 is shown as dually functioning to synchronize and provide an auxiliary drive, the timing gear 80 need not engage both drive cams 70*a*, 70*b*, nor is the use thereof limited to applications having counter-rotating drive cams 70*a*, 70*b*.

For example, the timing gear 80 may be driven by only one of the drive cams having peripheral gear teeth (this and subsequent configurations are not shown). Furthermore, the timing gear may be disposed to either side of one or both drive cams 70*a*, 70*b*. Finally, one or more timing gears may be employed and may intermesh with adjacent gears of the same or varying diameter dimensions to increase or decrease the rotational speed of the auxiliary shafts.

The counter-rotating, co-axial output shaft configuration of the present invention is particularly useful in applications wherein torque is sufficiently high so as to unintentionally or adversely affect the body or structure to which the ICE is affixed to or attached. To demonstrate this need, one could envision a drag racing automobile wherein the engine torque is sufficiently high to lift the front wheels of the automobile. Consequently, automobile designers resort to lengthening the nose or front end of the vehicle to develop a downward, gravity-induced, torque moment. Other, more common examples include the conventional compound helicopter or rotorcraft. In helicopter applications, torque loads are sufficiently high on the aircraft fuselage to require that other devices be employed to counteract the torque of the main rotor shaft. Typically, a tail rotor is employed to provide a yaw component of thrust to counteract the torque developed at the main bull gear where torque is input to the main rotor shaft. It will be appreciated, therefore, that the torque balanced-output of an ICE 10 according to the present invention could eliminate the need for a tail rotor, and the hundreds of pounds of weight associated with the tail drive shafts, tail rotor gearbox, and tail cone.

Yet other examples include heavy farm equipment wherein elongate arms or other stabilizing structure are occasionally used to "steady" the vehicle. Here again, high torque is developed in the engine, which causes the entire vehicle to rotate. Use of the ICE 10 of the present invention could eliminate the need for such stabilizing structure by providing torque-balanced output.

Figure 10:
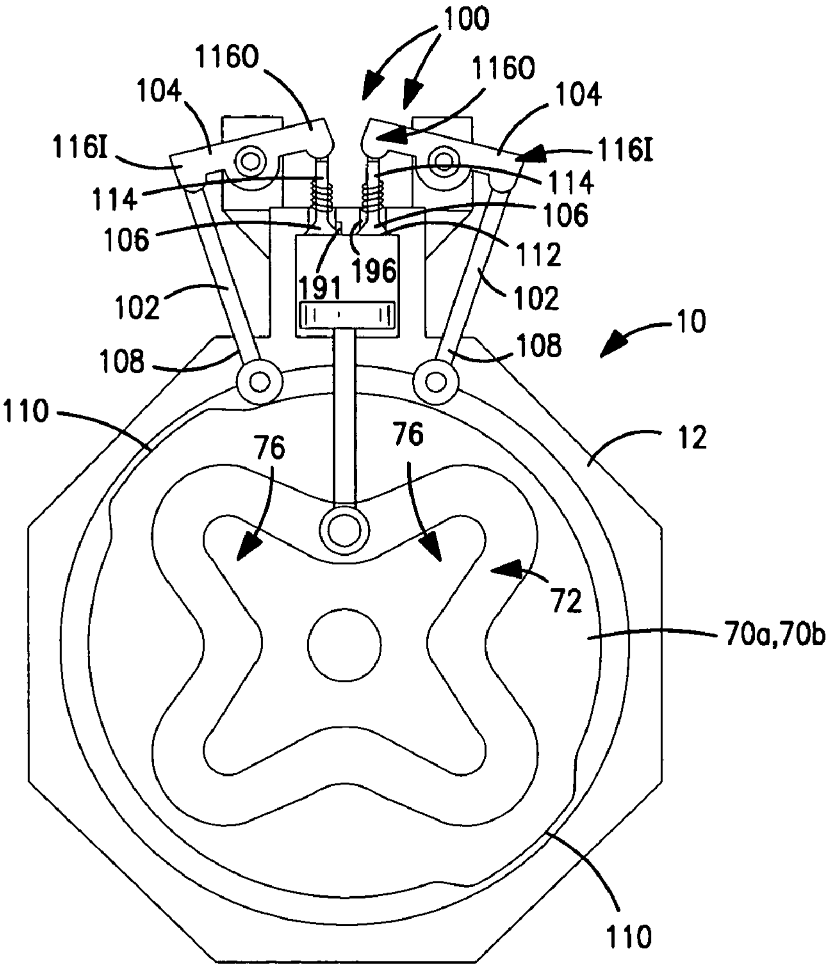
FIG. 10 depicts schematic view of another embodiment of the ICE wherein the drive cams and piston/cylinder have been modified to accommodate a four stroke air-standard cycle.

Should four-stroke fuel efficiency be desired, the ICE of the present invention may be readily adapted to accommodate this air-standard cycle. FIG. 10 shows a schematic of an exemplary embodiment of the ICE 10 adapted for a four-stroke cycle. Therein, the ICE 10 includes valve means 100 responsive and timed relative to the rotational displacement of the drive cams 70*a*, 70*b*. More specifically, the valve means includes spring-loaded plungers 102, rocker arms 104 and conventional stem valves 106. Each spring-loaded plunger 102 is disposed within a bore 108 of the housing 12 and contacts peripheral cam surfaces 110 formed about the periphery of one or both drive cams 70*a*, 70*b*. In the preferred description, a first spring bias means is employed to maintain the plungers in contact with the peripheral cam surfaces 110 as the cams 70*a*, 70*b* rotate.

The intake and exhaust stem valves 106 are conventional and include a seat portion 112 and a stem portion 114. The seat portion 112 is disposed internally of the cylinder and in register with a respective port 19*i* or 19*e*, while the stem portion 114 connects to the seat portion 112 and extends through its respective port 19*i* or 19*e*. The valves 106 are, furthermore, reposition able from an open position to a closed position, wherein the seat portion 112 thereof seats against the periphery of a respective port 19*i* or 19*e* in a closed position to provide a seal for preventing the flow of gases therethrough and permitting the flow of gases when in an open position. In the preferred description, a second spring bias means is employed to bias the valves 106 in an open or closed position while, furthermore, acting to support and center the valves 106 relative to its respective port.

The rocker arms 104 are disposed between and connect each spring-loaded plunger 102 to a respective each of the valves 106. More specifically, the rocker arms 104 each have an input and output end 1161 and 1160, respectively, and mount to the housing 12 about a pivot point 118. Furthermore, each input end 1161 pivotally mounts to one of the plungers 102 and each output end 1160 pivotally mounts to one of the valves 106.

In operation, rotation of the drive cams 70*a*, 70*b* within the housing 12 causes the peripheral cam surfaces 110 to displace the plungers 102, thereby pivoting the rocker arms 104 and opening and closing the valves 106 as a function of the angular position of the drive cams 70*a*, 70*b*.

Embodiments wherein the drive cams 70*a*, 70*b* rotate in opposite directions will require that each of the drive cams 70*a*, 70*b* include such cam surfaces. While the cam surfaces 110 are shown to project radially outward, it will be appreciated that any change in radial dimension, inwardly or outwardly will serve the intended purpose of the peripheral cam surfaces 110 (described in greater detail in the subsequent paragraphs). In the described embodiment there are at least two (2) such peripheral cam surfaces 110 equiangularly-spaced about the circumference of the drive cam 70*a* thereby opening and closing the valves 106 in a four stroke air-standard cycle.

In summary, the ICE 10 of the present invention provides a variety of advantages over prior art reciprocating piston engines which employ crankshafts and advantages over prior art turbine ICEs. Firstly, the ICE of the present invention capable of delivering superbly high torque while maintaining a relatively low output speed. As previously mentioned, tug boats, helicopters and locomotives are prime applications for the ICE of the present invention. Inasmuch as the ICE delivers this combination of attributes, the need for intermediate gear/speed reducing devices is eliminated or significantly diminished and, so too, are the weight, complexity, cost, and maintenance of such devices. Moreover, the rotational speed of the output drive shafts may be readily changed simply by altering the number of drive cam lobes 76.

Furthermore, as will be especially appreciated from the exploded view of the invention illustrated in FIG. 4, the ICE of the present invention employs a minimum number of moving components, thereby minimizing and improving reliability. Inasmuch as the ICE of the present invention defines discrete housing chambers, i.e., the piston cylinder may be sealed relative to the drive cam chamber(s), lubricants may be isolated from fuel and exhaust gases. Consequently, oil is not contaminated, reducing the need for frequent oil changes. Moreover, the ICE of the present invention is structurally efficient. Torque loads are reacted via a central web 44 such that bending moments are not applied to the central shaft 32 of the piston rod 30 nor to the reciprocating piston 24. As such, the reciprocating piston 24 does not experience sidewall scuffing or friction as is typically seen in ICEs employing crankshafts. In addition to prolonging the life of the piston rods, the ICE of the present invention eliminates or significantly reduces the need for oil in the fuel mixture (typically required in two-stroke reciprocating engines).

Inasmuch as the ICE preferably employs a two-stroke air standard cycle, the reciprocating piston delivers a power stroke with every two strokes of the piston. Furthermore, when employing a secondary ignition device 90 along the underside of the piston, a power stoke may be delivered with each stroke of the piston. Consequently, the ICE of the present invention maximizes power output.

Finally, the ICE of the present invention provides a torque-balanced output through the use of counter-rotating drive cams. As such, the body to which the ICE is affixed is not subjected to high torque loads, thereby eliminating the need for counter-balancing devices or fixtures, e.g., a helicopter tail rotor, or structural augmentation of engine mounts. Furthermore, the ICE provides a simple, accessible means for driving auxiliary power or take-off devices. That is, the timing gear, disposed between the drive cams and its thru-shaft, provide timed power output which may be used to drive alternators, generators, accumulators, tail rotor drive shafts, etc.

Although the invention has been described in terms of its various embodiments, one will appreciate that the teachings of the invention provide for various other embodiments which fall within the spirit and scope of the invention.

What is claimed is:

1. An Internal Combustion Engine (ICE) for delivering torque-balanced power output comprising:

a housing defining a chamber, spaced apart output apertures on an output axis, and piston rod apertures each defining a rod axis;

said rod axes being substantially radial relative to said output axis;

piston means for axially reciprocating a plurality of piston rods within said piston rod apertures;

first and second drive cams disposed within said housing chamber and being driven in opposite rotational directions co-axially on said output axis in response to said axial reciprocation of said piston rods;

first and second co-axial output drive shafts disposed respectively through said output apertures of said housing, and being co-axially coupled to said first and second drive cams for being driven in opposite rotational directions thereby delivering torque-balanced power output.

2. The Internal Combustion Engine (ICE} according to claim 1 wherein each of said drive cams includes gear teeth formed about the periphery thereof and further comprising:

a timing gear having teeth for intermeshing with said gear teeth of each of said drive cams thereby rotationally interconnecting said drive cams; and means for rotationally supporting said timing gear within said housing.

3. The internal combustion engine according to claim 2 wherein said housing includes a peripheral rim portion and a central web, said central web being disposed between each of said drive cams and having an opening therein radially adjacent to said peripheral rim;

a radial aperture is formed in said peripheral rim;

a radial shaft being is disposed in said radial aperture and extending extends into said opening of said central web; and said timing gear is supported by and rotates about said radial shaft.

4. The internal combustion engine according to claim 3 wherein said radial shaft extends through said peripheral rim to alternatively function as an auxiliary drive shaft.

5. The internal combustion engine according to claim 1 wherein said housing defines a cylindrical bore for accepting each of said pistons;

said piston rods including a central shaft connecting to each of said pistons at one end thereof, and a cross-member connecting to the other end of said central shaft and disposed substantially perpendicular to said central shaft;

said first and second drive cams being angularly offset relative to each other and rotationally coupled to one of said output drive shafts, each of said drive cams having a continuous pathway circumscribing said output axis and defining Y number of lobes, each of said lobes including a power stoke surface; and bearing means interposed between and connecting an outermost end portion of each said piston rod cross member and said lobed pathway of said drive cams.

6. The internal combustion engine according to claim 5 wherein said housing includes a center body having a central web defining two housing chambers, said central web, furthermore, having radial slots formed therein to accept the passage of each said piston rod cross member, and wherein at least two of said radial apertures of said housing lie in a common plane, said central web being substantially coplanar with said common plane.

7. The internal combustion engine according to claim 6 wherein said central web is a substantially unity structure interconnecting diametrically opposed ends of said housing center body.

8. The internal combustion engine according to claim 7 further comprising a pair of rolling element bearing interposed between innermost portions of each piston rod cross member and each of said radial slots.

9. The internal combustion engine according to claim 6 wherein each of said chambers contains a lubricating fluid.

10. The internal combustion engine according to claim 6 wherein said housing includes intake and exhaust ports, and axial reciprocation of said piston effects opening and closing of said ports in a two-stroke air-standard fuel cycle.

11. The internal combustion engine according to claim 5 further comprising sealing means disposed between the central shaft of each piston rod and the respective radial aperture.

12. The internal combustion engine according to claim 1 wherein said piston means includes at least four reciprocating pistons, and each of said cam drives has at least two lobes.

13. The internal combustion engine according to claim 12 wherein said number of lobes of said first drive cam is a multiple integer of the number of lobes of said second drive cam.

14. The internal combustion engine according to claim 1 wherein at least one of said drive cams includes gear teeth disposed about its periphery;

an auxiliary output drive shaft is disposed through said housing; and a timing intermeshes and rotates with said peripheral drive cam teeth to drive said auxiliary output drive shaft.

15. The internal combustion engine according to claim 14 wherein each of said drive cams includes gear teeth disposed about its periphery and wherein said timing gear intermeshes with the peripheral drive cam teeth of both said drive cams.

16. The internal combustion engine according to claim 15 wherein said auxiliary output drive shaft is disposed between adjacent piston rods and is substantially coplanar with a central web dividing said chamber with a drive cam on either side thereof.

17. The internal combustion engine according to claim 1 wherein each of said pistons reciprocates within a cylindrical bore of said housing, and further comprising:

a seal disposed between said central shaft of said piston rod and said piston rod aperture and, first and second ignition devices disposed in said cylindrical bore and on each said of said piston.

18. The internal combustion engine according to claim 17 wherein each said drive cam has a lobed raceway that includes first and second power stroke surfaces, said second power stroke surface opposing said first power stroke surface, and wherein said piston rod engages said first power stroke surface in response to reciprocation of said piston in one direction and engages said second power stroke surface in response to reciprocation of said piston in an opposite direction.

19. The internal combustion engine according to claim 17 wherein each said piston rod includes a cross member;

each of said first and second cams has a plurality of lobed raceways, said lobed raceways of said first drive cam facing the lobed raceways of the second drive cam, and bearing means are disposed at each end of said cross member and engage each of said lobed raceways.

20. The internal combustion engine according to claim 1 wherein at least one of said drive cams includes peripheral cam surfaces, wherein each of said pistons reciprocates within a cylindrical bore of said housing, each said cylindrical bore defining at least one intake port and exhaust port, and further comprising:

valve means responsive to rotational displacement of said peripheral cam surfaces, to open and close each said intake and exhaust port in a four-stroke air-standard cycle.

21. The internal combustion engine according to claim 20 wherein said valve means includes:

intake and exhaust valves each having a seat and stem portion, said seat portion being disposed internally of said cylinder and in register with a respective port, said stem portion connecting to said seat portion and extending through said respective port, said valves being repositioned from an open position to a closed position, said seat portion thereof seating against the periphery of said respective port in a closed position to provide a seal for preventing flow of gases through and permitting the flow of gases therethrough in an open position;

spring-loaded plungers disposed within a bore of said housing and contacting said peripheral cam surfaces at one end thereof, said spring-loaded plunger being juxtaposed relative to said cylinder bore;

a rocker arm each having input and output ends and mounting to said housing about a pivot point, each said input end being pivotally mounted to one of said spring-loaded plungers and each said output end being pivotally mounted to one of said valves; and first spring bias means for biasing said valves in either said open or closed position and supporting-centering each said valve relative to its respective port;

second spring bias means for biasing said spring-loaded plunger in contact with said peripheral cam surfaces;

whereby rotation of said drive cam within said housing causes said peripheral cam surfaces to displace said spring-loaded plungers, thereby pivoting said rocker anus, and opening and closing said valves as a function of the rotational position of said drive cam.

22. The internal combustion engine according to claim 21 wherein said drive cams have at least four peripheral cam surfaces equiangularly disposed about the circumference of said drive cam.

23. An Internal Combustion Engine (ICE) having at least one output drive shaft rotating about an axis of rotation, comprising:

X number of reciprocating pistons;

a piston rod connecting to and reciprocating with each of said pistons, said piston rod including a central shaft connecting to each of said pistons at one end thereof, and a cross-member connecting to the other end of said central shaft and disposed substantially perpendicular thereto;

a housing defining at least two chambers and having aligned apertures for accepting said output drive shaft and extending into each of said chambers, said housing, furthermore, defining a cylindrical bore for accepting each of said pistons, and an aperture for accepting each of said piston rods, each said cylindrical bore and associated aperture being substantially radial relative to said drive shaft axis;

drive cams disposed in each of said housing chambers and rotationally coupled to said output drive shaft, each of said drive cams having a continuous pathway circumscribing said drive shaft axis and defining Y number of lobes, each of said lobes including a power stroke surface;

bearing means interposed between and connecting an outermost end portion of each said cross member and each said lobed pathway of said drive cams;

whereby axial motion of each said piston rod acts on said power stroke surfaces of said drive cams to effect rotational motion thereof thereby imparting torque to said output drive shaft;

wherein each of said drive cams includes gear teeth disposed about its periphery; and a timing gear intermeshes and rotates with said peripheral drive cam teeth on both said drive cams.

24. The internal combustion engine according to claim 23 wherein said housing includes a center body having a central web separating said chambers, said central web, furthermore, having radial slots formed therein to accept the passage of each said piston rod cross member, and wherein at least two of said radial apertures of said housing lie in a common plane, said central web being substantial coplanar with said common plane.

25. The internal combustion engine according to claim 24 wherein said central web is a substantially unity structure interconnecting diametrically opposed ends of a peripheral rim portion of said housing center body.

26. The internal combustion engine according to claim 25 further comprising a pair of rolling element bearing interposed between innermost portions of each piston rod cross member and each of said radial slots.

27. The internal combustion engine according to claim 23 further comprising sealing means disposed between the central shaft of each piston rod and a respective radial aperture.

28. The internal combustion engine according to claim 27 wherein each of said chambers contains a lubricating fluid.

29. The internal combustion engine according to claim 23 wherein said housing includes intake and exhaust ports such that axial reciprocation of said piston effects opening and closing of said ports in a two-stroke air-standard fuel cycle.

30. The internal combustion engine according to claim 23 wherein the X number of reciprocating pistons is at least four and the number Y of pathway lobes is at least two.

31. The internal combustion engine according to claim 30 wherein said number of reciprocating pistons X is equal to at least eight and said number of drive cam lobes Y is equal to at least four.

32. The internal combustion engine according to claim 23 wherein said Y number of lobes of said first drive cam is a multiple integer of said Y number of lobes of said second drive cam.

33. The internal combustion engine according to claim 23 wherein each of said pistons reciprocates within a cylindrical bore of said housing, and further comprising:

a seal disposed between said central shaft of said piston rod and said piston rod aperture; and first and second ignition devices disposed in said cylindrical bore and on each of said pistons.

34. The internal combustion engine according to claim 33 wherein said lobed raceway of said drive cam includes first and second power stroke surfaces, said second power stroke surface opposing said first power stroke surface, and wherein said piston rod engages said first power stroke surface in response to reciprocation of said piston in one direction, and engages said second power stroke surface in response to reciprocation of said piston in an opposite direction.

35. The internal combustion engine according to claim 23 wherein at least one of said drive cams includes peripheral cam surfaces, wherein each of said pistons reciprocates within a cylindrical bore of said housing, each said cylindrical bore defining at least one intake port and exhaust port, and further comprising:

valve means responsive to rotational displacement of said peripheral cam surfaces to open and close each said intake and exhaust port in a four-stroke air-standard cycle.

36. The internal combustion engine according to claim 35 wherein said valve means includes:

intake and exhaust valves each having a seat and stem portion, said seat portion being disposed internally of said cylinder and in register with a respective port, said stem portion connecting to said seat portion and extending through said respective port, said valves being repositioned from an open position to a closed position, said seat portion thereof seating against the periphery of said respective port in a closed position to provide a seal for preventing flow of gases therethrough and permitting the flow of gases therethrough in an open position;

spring-loaded plungers disposed within bores of said housing and contacting said peripheral cam surfaces at one end thereof, said spring-loaded plunger being juxtaposed relative to said cylinder bore;

a rocker arm each having input and output ends and mounting to said housing about a pivot point, each said input end being pivotally mounted to one of said spring-loaded plungers and each said output end being pivotally mounted to one of said valves;

first spring bias means for biasing said valves in either said open or closed position and supporting-centering each said valve relative to its respective port;

second spring bias means for biasing said spring-loaded plunger in contact with said peripheral cam surfaces;

whereby rotation of said drive cam within said housing causes said peripheral cam surfaces to displace said spring-loaded plungers, thereby pivoting said rocker arms, and opening and closing said valves as a function of the angular position of said drive cam.

37. The internal combustion engine according to claim 36 wherein said drive cams have at least four peripheral cam surfaces equiangularly disposed about the circumference of said drive cam.

38. An Internal Combustion Engine (ICE) having at least one output drive shaft rotating about an axis of rotation, comprising:

X number of reciprocating pistons;

a piston rod connecting to and reciprocating with each of said pistons, said piston rod including a central shaft connecting to each of said pistons at one end thereof, and a cross-member connecting to the other end of said central shaft and disposed substantially perpendicular thereto;

a housing defining at least two chambers and having aligned apertures for accepting said output drive shaft and extending into each of said chambers, said housing, furthermore, defining a cylindrical bore for accepting each of said pistons, and an aperture for accepting each of said piston rods, each said cylindrical bore and associated aperture being substantially radial relative to said drive shaft axis;

drive cams disposed in each of said housing chambers and rotationally coupled to said output drive shaft, each of said drive cams having a continuous pathway circumscribing said drive shaft axis and defining Y number of lobes, each of said lobes including a power stroke surface;

bearing means interposed between and connecting an outermost end portion of each said cross member and each said lobed pathway of said drive cams;

whereby axial motion of each said piston rod acts on said power stroke surfaces of said drive cams to effect rotational motion thereof thereby imparting torque to said output drive shaft;

wherein at least one of said drive cams includes gear teeth disposed about its periphery;

an auxiliary output drive shaft is disposed through said housing; and a timing gear intermeshes and rotates with said peripheral drive cam teeth to drive said auxiliary output drive shaft.

39. The internal combustion engine according to claim 38 wherein said auxiliary output drive shaft is disposed between adjacent piston rods and is substantially coplanar with a central web between two of said chambers.

* * * * *